United States Patent [19]

Watanabe et al.

[11] Patent Number: 5,316,420
[45] Date of Patent: May 31, 1994

[54] SUPPORT FOR A ROTARY MACHINE TOOL

[75] Inventors: Kazumi Watanabe; Reiichiro Kashihara, both of Iwata, Japan

[73] Assignee: Yamaha Hatsudoki Kabushiki Kaisha, Shizuoaka, Japan

[21] Appl. No.: 848,267

[22] Filed: Mar. 9, 1992

[30] Foreign Application Priority Data

Mar. 15, 1991 [JP] Japan .................................. 3-076808

[51] Int. Cl.⁵ ............................................... B23C 1/00
[52] U.S. Cl. .................................... 409/190; 248/678; 408/234; 409/235
[58] Field of Search ............... 409/190, 191, 198, 235; 408/234; 248/678, 679

[56] References Cited

U.S. PATENT DOCUMENTS

| | | | |
|---|---|---|---|
| 2,789,480 | 4/1957 | Wellauer | 409/235 |
| 3,460,435 | 8/1969 | Hucks et al. | 409/235 |
| 4,856,752 | 8/1989 | Linn | 248/678 |

FOREIGN PATENT DOCUMENTS 1153962 9/1963 Fed. Rep. of Germany ...... 408/234

*Primary Examiner*—Daniel W. Howell
*Attorney, Agent, or Firm*—Bacon & Thomas

[57] ABSTRACT

A reinforcement rib structure for a support column of a rotary machine tool is disclosed. The reinforcement rib structure includes a first set of ribs which are inclined clockwise with respect to the vertical and a second set of ribs which are inclined counterclockwise with respect to the vertical such that the first and second ribs intersect each other. In the preferred embodiment, the ribs are formed on opposing sidewalls of the support column and form acute angles with respect to a vertical within the range of 30°±20%. With this reinforcing rib structure, the rotary machine tool may be operated at higher speeds while maintaining machining accuracy due to the enhanced rigidity of the support column with minimal weight increase.

15 Claims, 4 Drawing Sheets

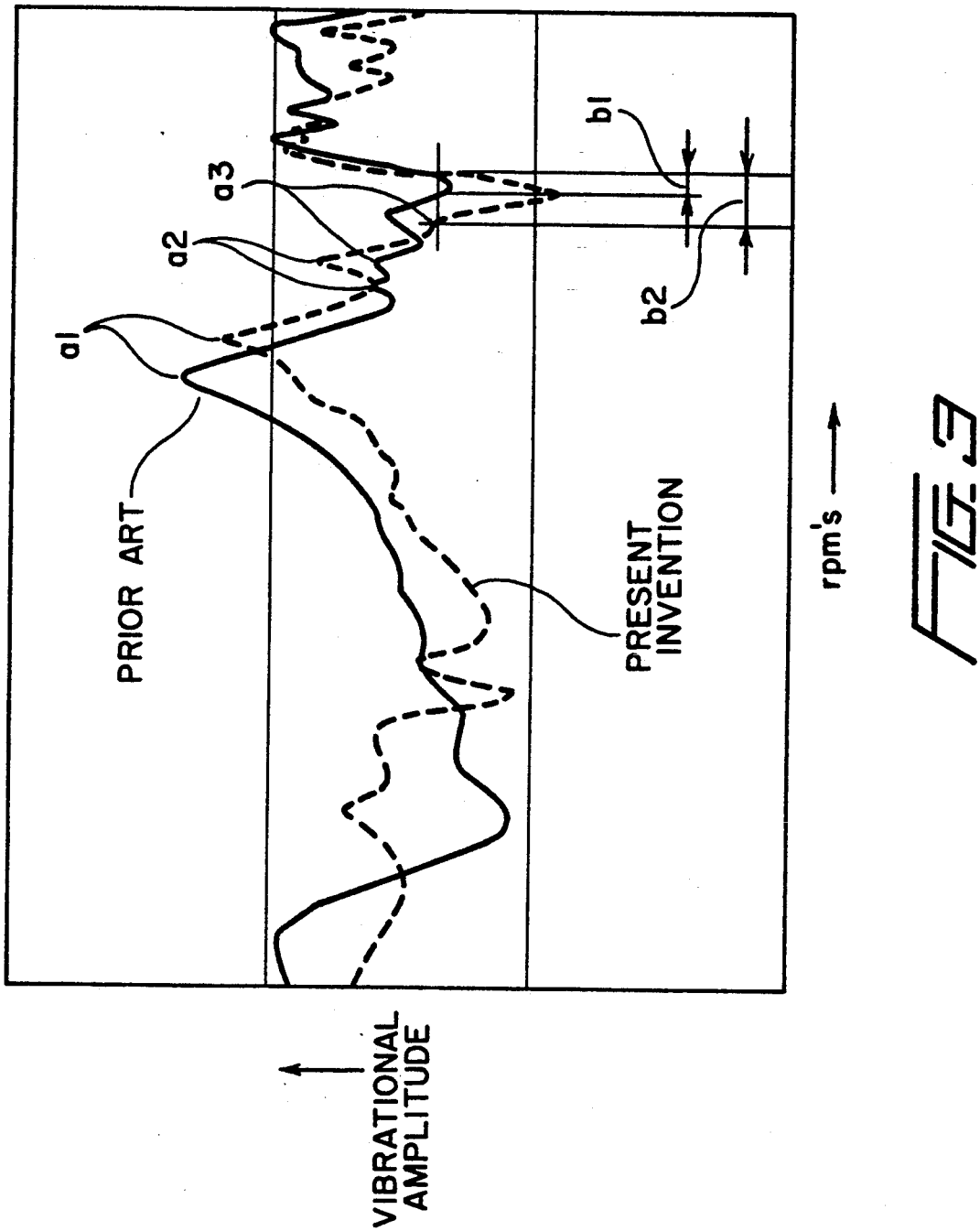

| | K | √K | m |
|---|---|---|---|
| 2.5$^t$ | 1 | 1 | 1 |
| 5.0$^t$ | 1.11 | 1.05 | 1.28 |

| | K | √K | m |
|---|---|---|---|
| 2.5$^t$ | 1.36 | 1.16 | 1.26 |
| 5.0$^t$ | 2.22 | 1.49 | 1.80 |

| | K | √K | m |
|---|---|---|---|
| 2.5$^t$ | 2.13 | 1.46 | 0.98 |
| 5.0$^t$ | 2.73 | 1.65 | 1.23 |

SUPPORT FOR A ROTARY MACHINE TOOL

BACKGROUND OF THE INVENTION

1. Field of the Invention

The present invention pertains to a support for a rotary machine tool and more specifically to a support column including various reinforcement ribs extending at an angle to the vertical to maximize the twisting and bending rigidity of the column while minimizing its weight.

2. Discussion of the Prior Art

Rotary machine tools which are mounted for linear movement between an operating position and a non-operating position are known in the art. In such machine tool arrangements, the machine tool itself is secured to a support column which is movable between these positions. Such machine tools generally include a motor, such an electric motor, and a working element which projects outwardly from the column support in the direction of movement. Such working elements generally comprise a rotating spindle head to which various tools, such as cutters and grinders, are detachably secured. These working elements engage a workpiece when the column support is moved to its operating position.

In recent years, it has become desirable to increase the operating speed of such machines while still maintaining or even increasing the machining accuracy. In the prior art, it has been found that raising the rotating speed of the spindle head causes known support columns to vibrate thereby decreasing the machining accuracy. Therefore, in order to increase the machining process speed while maintaining the machining accuracy, it is necessary to increase the rigidity of the support column. If the rigidity of the support column is made too low, the column is apt to vibrate by the reaction force from the machine tool which reduces machining accuracy as discussed above. In addition, while increasing the rigidity of the column is a main concern, it is also important to minimize the increase in the weight of the column since the column is required to move during operation.

Prior art arrangements have increased the rigidity of such support columns in basically two manners. First, it has been proposed to increase the thickness of the column itself. Unfortunately, although this solves the rigidity problem, the weight of the support column is substantially increased which, as stated above, is undesirable. In another known solution, both horizontal and vertical reinforcement ribs have been formed on the inside surface of the support column. These ribs intersect each other at right angles to form a lattice work. With this proposed solution, it has been found that numerous closely spaced, intersecting ribs must be provided in order to solve the rigidity problem. This prior art rib design again has been found to disadvantageously increase the weight of the column.

Therefore, it can be seen that prior art solutions to the present problem have resulted in support column weight increases which result in an increase in the column inertia mass and results in a drop in the transfer speed of the column between its operating positions. This reduction and transfer speed reduces production efficiency of the machine tool. Therefore, there exists a need in the art for a reinforced support column for a machine tool which will improve the column rigidity while minimizing its weight increase to therefore increase machining accuracy while maintaining a high machining process speed.

SUMMARY OF THE INVENTION

The present invention has for its object increasing the structural rigidity of a machining tool support column while minimizing the weight increase of the column. This object is realized in accordance with this invention by forming various, elongated reinforcement ribs on the inside surface of the column. These reinforcing ribs include a first set of ribs which are inclined clockwise with respect to the vertical and a second set of ribs which are inclined counterclockwise with respect to the vertical such that the first and second sets of ribs intersect each other to form various rhombs, each of which have a height which is larger than its width. In the preferred embodiment, the first and second sets of ribs are inclined with respect to the vertical at an angle of approximately 30°.

BRIEF DESCRIPTION OF THE DRAWINGS

FIG. 3 is a diagram wherein spindle speed versus vibration amplitude is charted for column supports having reinforcement ribs according to both the prior art and the present invention.

FIGS 4A–4C depict perspective views of various vibrational modes which the support column of the present invention is subjected to.

DETAILED DESCRIPTION OF A PREFERRED EMBODIMENT

Figure 1:
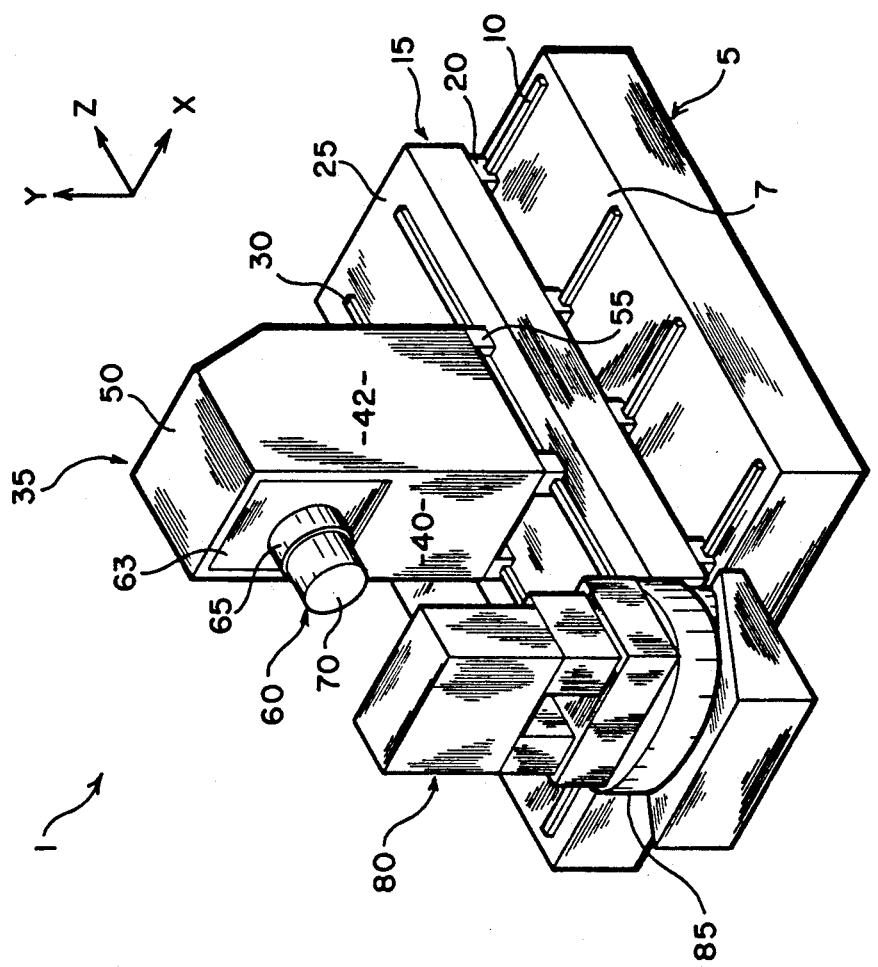
FIG. 1 is a perspective view of a machine tool assembly having a column support incorporating the reinforcement structure of the present invention.

With initial reference to FIG. 1, the reinforcement structure of the present invention is particularly adaptable for use on a support column of a horizontally adjustable machine tool assembly generally indicated at 1. Machine tool assembly 1 includes a bed 5 which is adapted to be fixedly secured to a floor. Fixedly secured to a top surface 7 of bed 5 are a plurality of guide rails 10 which, as indicated by the directional arrows in FIG. 1, extend across bed 5 in the X-direction and are laterally spaced in the Z-direction. In the embodiment shown, four such guide rails 10 are depicted.

Located above bed 5 is a saddle member 15, a lower surface of which has fixedly secured thereto a plurality of guide blocks 20. Guide blocks 20 include a central recess (not labeled) for receiving guide rails 10 such that saddle member 15 is slidable relative to bed 5 in the X-direction. Saddle member 15 further includes an upper surface 25 upon which a spaced pair of guide rails 30, similar to guide rails 10, are fixedly secured by any means known in the art. As shown, guide rails 30 extend in the Z-direction.

Figure 4A:
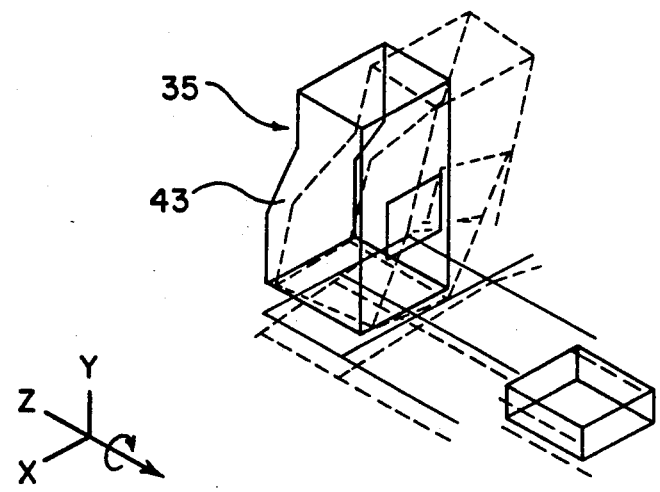
Figure 4B:
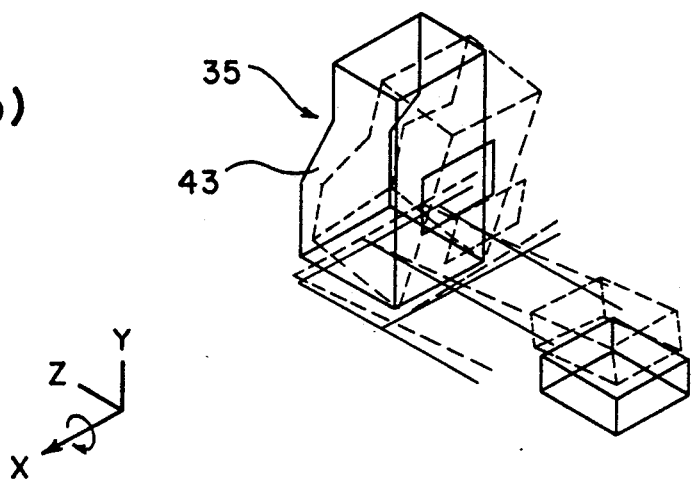
Figure 4C:
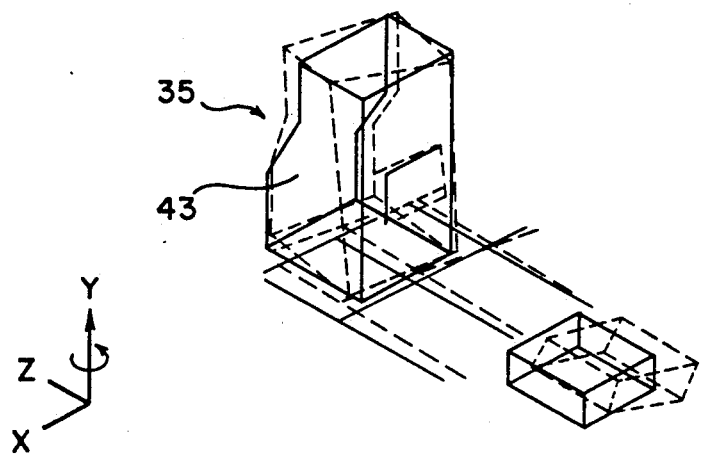

Slidably mounted upon guide rails 30 of saddle member 15 is a support column 35 which includes a front upstanding wall portion 40, a pair of opposed, upstanding sidewalls 42, 43 (sidewall 43 being shown in FIGS. 4(a)–4(c)), a rear wall including a first upstanding portion 45 and a forwardly angled portion 47 (also see FIG. 3), a top portion 50 and a bottom portion 52 which collectively form an integral enclosure. Secured at the corners of bottom portion 52 are various guide blocks 55 which are formed with recesses analogous to the recesses in guide blocks 20 such that support column 35 is slidably mounted upon guide rails 30 in the Z-direction.

Upstanding front wall 40 is formed with an opening (not labeled) for a rotary machine tool assembly generally indicated at 60. Rotary machine tool assembly 60 includes a mounting plate 63 which has secured thereto a bearing sleeve 65. Mounting plate 63 is adapted to be fixedly secured to support column 35 by any means known in the art. Extending through bearing sleeve 65 is a spindle head which is adapted to be rotated by a motor (not shown), e.g. an electric motor, located within support column 35 or within spindle head 70 itself. Although not shown, a tool, such as commonly used in cutting and grinding, is adapted to be detachably mounted to spindle head 70 and to extend in the horizontal Z-direction so as to be rotatably driven by the motor discussed above. The tool is adapted to machine a workpiece (not shown) which is mounted upon a pallet assembly 80 located on an indexing table 85 as support column 35 is moved in a forward (Z) direction towards pilot assembly 80 during a machining process.

Figure 2:
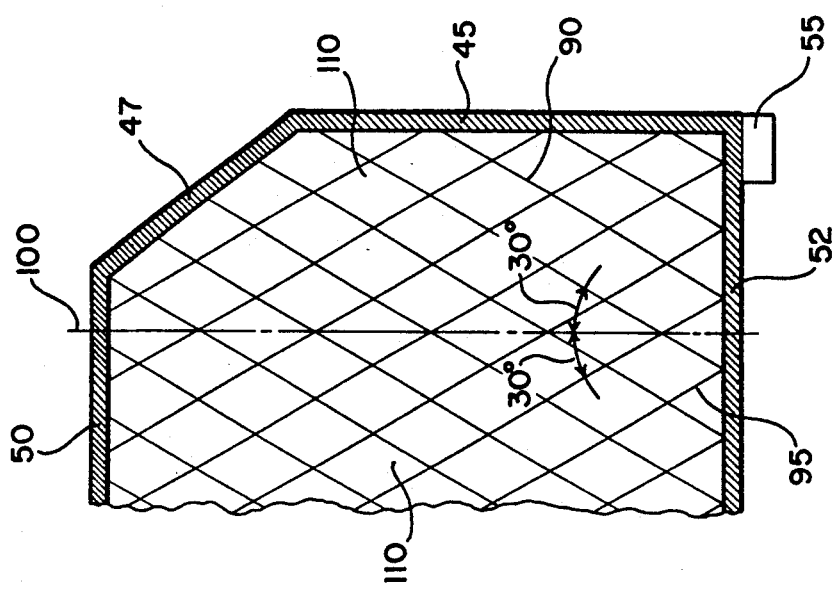
FIG. 2 is a cross sectional view of a rear portion of the support column shown in FIG. 1 depicting the reinforcement structure.

During the machining process, support column 35 may be subject to various twisting and bending moments about each of the axes X, Y and Z as indicated in FIGS. 4(a)-4(c) as will be discussed more fully below. With reference to FIG. 2, upstanding sidewall 42 of support column 35 is shown formed with a plurality of reinforcement ribs 90, 95. As depicted, the first set of ribs 90 are inclined clockwise with respect to the vertical indicated by line 100. The second set of ribs 95 are inclined counterclockwise with respect to the vertical 100. Reinforcement ribs 90 and 95 intersect each other to form a plurality of rhombs 110, each of which has a height which is greater than its width. In the preferred embodiment, reinforcement ribs 90, 95 are respectively inclined by 30° with respect to the vertical 100. Through experimentation, it has been found that this angle may be greatly varied while still achieving some advantages over the prior art, however, significant structural rigidity advantages have been found when these reinforcement ribs 90, 95 are inclined at an acute angle to the vertical 100 within a range of 24°–36° (i.e. 30°±20%).

By utilizing reinforcement ribs 90, 95 on some or all the walls of support column 35 as discussed above, the rigidity of support column 35 has been found to be greatly enhanced over the prior art while minimizing the weight increase of support column 35. Increasing the rigidity is necessary in order to operate the rotary machine tool 60 at a high rpm. Also, since support column 35 must move along guide rails 30 of upper surface 25 of saddle member 15 such that the working element secured to spindle head 70 may increasingly engage the workpiece mounted atop pallet assembly 80, the inclusion of reinforcement ribs 90, 95 according to the present invention is specifically designed to not substantially increase the weight of support column 35. This increase in structural rigidity and the minimal weight increase will be further discussed below with reference to FIGS. 5(a)-5(c).

Although reinforcement ribs 90, 95 have only been provided on upstanding sidewall 42 in the above described arrangement, it should be recognized that additional ribs could also be provided on upstanding front wall 40, sidewall 43, upstanding rear wall portion 45, forwardly angled portion 47 and even top and bottom portions 50, 52 of support column 35 or any combination thereof. Preferably ribs 90, 95 are only provided on the upstanding sidewalls 42, 43 and front wall 40. Ribs are not provided on these additional structural elements in the preferred embodiment simply due to the fact that it has been found through experimentation that inclusion of such additional ribs would detract from the need to restrain the weight increase of support column 35. The advantages of the reinforcement rib arrangement of the present invention will become more greatly apparent with the discussion of FIGS. 3-5.

FIG. 3 depicts a diagram which plots rotating speed of spindle head 70 versus vibrational amplitudes (acceleration/force) of the spindle head 70. In the diagram, the solid line shows the characteristics of a conventional reinforcement rib structure according to the pattern shown in FIG. 5(b) while the broken line shows the characteristics associated with a support column provided with the reinforcement ribs according to the present invention. The peak points a1, a2 and a3 indicate the amplitude of the support column about the Z-axis (left-right swing), about the X-axis (fore-aft swing) and about the Y-axis (twist) respectively as shown in FIG. 4. As clearly seen in these figures, a support column incorporating the reinforcement ribs of the present invention minimizes the left-right swing about the Z-axis (lower a1 point) and the twist about the Y-axis (lower 3a point). Of course, it is preferably to operate rotor machine tool 60 at its highest rpm possible which corresponds to a relatively low vibrational amplitude. If rotary machine tool 60 is to be operated such that the lowest vibrational amplitude may be achieved at a relatively high rpm, a machine according to the prior art would have to be operated within the range b1 shown in FIG. 3. However, with the reinforcement rib structure of the present invention, rotary machine tool 60 can operate within range b2 which has a width generally twice that of the conventional range b1 while still maintaining vibrational amplitudes which are at least as low as those in the b1 range. Of course, as clearly evident from viewing FIG. 3, a rotary machine tool 60 mounted upon a support column 35 having reinforcement ribs 90, 95 according to the present invention can operate at a much lower vibrational amplitude within range b2.

Figure 5A:
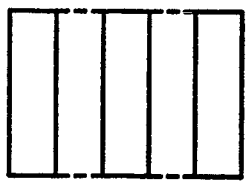
FIGS. 5A–5C depict tables showing the relationship between various reinforcement rib patterns and the corresponding rigidity and weight characteristics of a support column incorporating these patterns.
Figure 5B:
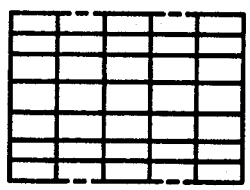
Figure 5C:
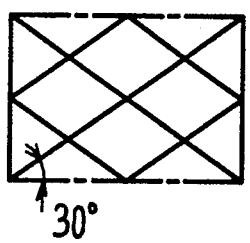

From viewing FIGS. 5(a)-5(c), different reinforcement rib patterns and their experimental results for ribs having 2.5 mm and 5.0 mm thicknesses are charted. The FIG. 5(a) rib pattern was selected as a reference pattern shape wherein the rigidity k and the weight m associated with such a pattern were used as reference values against which various experimental reinforcement rib patterns were compared.

FIG. 5(b) shows a conventional reinforcement rib pattern, as discussed above, wherein the ribs are formed so that they perpendicularly intersect one another. From viewing the chart, it can readily be seen that this reinforcement rib pattern resulted in a rigidity increase of only 36% while its weight increased by 26% as compared with the reference pattern shape.

The reinforcement rib arrangement of the present invention as depicted in FIG. 5(c) resulted in a slight decrease in the weight m and a significantly increased rigidity k as compared to the reference pattern. In fact, the rigidity k more than doubled the rigidity factor of the reference pattern. Therefore, it can readily be seen that the reinforcement rib arrangement of the present invention when used by a support column of a rotary machine tool functions to improve the rigidity of the column while restraining the weight increase and, consequently, enables the rotary machine tool to be used at a higher operating speed while maintaining machining accuracy.

Although described with respect to a particular embodiment of the invention, it is to be understood that various changes and/or modifications can be made to the present invention without departing from the spirit and scope of the invention as defined by the following claims.

We claim:

1. A support for a rotary machine tool comprising a column including a first upstanding wall having first and second edges, said first upstanding wall being located in a first plane and adapted to mountably receive a rotary machine tool; a second upstanding wall secured to said first upstanding wall along one of said first and second edges and located in a second plane; and a third upstanding wall secured along the other one of said first and second edges and located in a third plane; said first, second and third upstanding walls having a predetermined thickness, at least one of said upstanding walls being formed with a plurality of elongated reinforcing ribs extending at an acute angle with respect to the vertical, wherein said plurality of reinforcing ribs include a first set of ribs which are inclined in a clockwise direction with respect to the vertical and a second set of ribs which are inclined in a counterclockwise direction with respect to the vertical, with said first and second sets of ribs intersecting each other to form various rhombs, each of said rhombs having a height which is larger than its width.

2. The support of claim 1, wherein said first and second sets of ribs are inclined with respect to the vertical at an angle within a range of 24 to 36 degrees.

3. The support of claim 1, wherein said column is generally rectangular in shape and includes a top which interconnects each of said upstanding walls thereby defining at least a partial enclosure.

4. The support of claim 3, wherein said plurality of reinforcing ribs are located towards the interior of said enclosure.

5. The support of claim 1, wherein each of said first, second and third upstanding walls is formed with a plurality of reinforcing ribs.

6. The support of claim 2, wherein each of said first, second and third upstanding walls is formed with a plurality of reinforcing ribs.

7. The support of claim 1, wherein each of said first, second and third upstanding walls is formed with a plurality of reinforcing ribs.

8. A machine tool assembly comprising:
an upstanding support column including at least a front wall, a pair of spaced, opposed sidewalls and a top which are secured together along respective edges thereof;
a machine tool fixedly secured to said front wall and having a working element projecting therefrom; and
a plurality of elongated reinforcing ribs formed as part of at least said pair of spaced, opposed sidewalls, said reinforcing ribs extending at an acute angle with respect to the vertical; and
a saddle upon which said support column is mounted for linear movement in a first direction.

9. The machine tool assembly of claim 8, wherein said plurality of reinforcing ribs include a first set of ribs which are inclined in a clockwise direction with respect to the vertical and a second set of ribs which are inclined in counterclockwise direction with respect to the vertical such that said first and second sets of ribs intersect each other.

10. The machine tool assembly of claim 9, wherein said first and second sets of ribs are inclined with respect to the vertical at an angle within a range of 24 to 36 degrees.

11. The machine tool assembly of claim 9, wherein said first and second sets of ribs intersect each other to form various rhombs.

12. The machine tool assembly of claim 11, wherein each of said rhombs has a height which is larger than its width.

13. The machine tool assembly of claim 8, wherein said support column further includes a rear wall such that said support column defines an enclosure, said plurality of reinforcing ribs being located within said enclosure.

14. The machine tool assembly of claim 8, further including a bed upon which said saddle is mounted for linear movement in a second direction.

15. The machine tool assembly of claim 14, further including an indexing table positioned opposite said working element adjacent said saddle in said first direction.

* * * * *